United States Patent [19]
Gerber

[11] Patent Number: 5,296,520
[45] Date of Patent: Mar. 22, 1994

[54] LATENT ACID CURABLE COMPOSITIONS

[75] Inventor: Arthur H. Gerber, Louisville, Ky.

[73] Assignee: Borden, Inc., Columbus, Ohio

[21] Appl. No.: 988,247

[22] Filed: Dec. 9, 1992

[51] Int. Cl.$^5$ .............................................. C08K 5/51
[52] U.S. Cl. .................................. 524/128; 528/129; 525/480; 525/485
[58] Field of Search ............... 528/129; 525/480, 485; 524/128

[56] References Cited

U.S. PATENT DOCUMENTS

| | | | |
|---|---|---|---|
| 2,330,286 | 9/1943 | Honel | 260/34 |
| 2,816,876 | 12/1957 | Higashi | 260/45.7 |
| 3,119,783 | 1/1964 | Baum | 260/43 |
| 3,121,731 | 2/1964 | Quesnel et al. | 260/461 |
| 3,127,369 | 3/1964 | Warren | 260/43 |
| 3,634,317 | 1/1972 | Klemke | 260/45.7 P |
| 4,195,154 | 3/1980 | Kasier et al. | 528/98 |
| 4,395,520 | 7/1983 | Chow et al. | 525/502 |
| 4,395,521 | 7/1983 | Chow et al. | 525/502 |
| 4,403,066 | 9/1983 | Brode et al. | 524/876 |
| 4,430,491 | 2/1984 | Culbertson et al. | 528/153 |
| 4,474,942 | 10/1984 | Sano et al. | 528/363 |
| 4,613,662 | 9/1986 | Goel | 528/137 |
| 4,699,970 | 10/1987 | Tiba et al. | 528/141 |
| 4,748,230 | 5/1988 | Tiba et al. | 528/211 |
| 4,814,223 | 3/1989 | Tiba et al. | 428/246 |
| 5,096,983 | 3/1992 | Gerber | 525/506 |

FOREIGN PATENT DOCUMENTS

| | | | |
|---|---|---|---|
| 0141345 | 5/1985 | European Pat. Off. | C08G 69/44 |
| 0171670 | 2/1986 | European Pat. Off. | |
| 51-004373 | 6/1976 | Japan. | |
| 59-19050 | 1/1984 | Japan. | |
| 1029210 | 7/1983 | U.S.S.R. | |

OTHER PUBLICATIONS

"Organic Chemicals/Ethyloxazoline", Dow's New Award-Winning Intermediate Development, Dow Chem.

G. Brode et al., ACS Polymer Preprints, 24 (2), 192, (1983).

*Primary Examiner*—Morton Foelak
*Assistant Examiner*—S. A. Acquah
*Attorney, Agent, or Firm*—George P. Maskas; Dennis H. Rainear; Kenneth P. Van Wyck

[57] ABSTRACT

Compositions containing aryl phosphites and water to hydrolyze the aryl phosphite provide controlled and extended work time when used as hardening agents for the ambient temperature hardening of phenolic resins and for rapid hardening of such resins at modestly elevated temperatures. Pre-solvolysis with small quantities of water, alkanols of 1 to 4 carbon atoms or alkylene glycols of 2 to 4 carbon atoms improve compatibility of trisubstituted phosphites with the resin. Pre-hydrolysis of the phosphites as well as addition of furfuryl alcohol or alkylene glycols of 2 to 4 carbon atoms accelerate the hardening (curing) of the resin. Various compounds such as: carboxylic acid amides, urea, dicyandiamide, N-methylolated amides, N-alkyl 2-pyrrolidinones having 1 to 4 carbon atoms in the alkyl group, those having an internal epoxide group, alkanols, and Schiff bases retard the ambient temperature hardening of the resin with the aryl phosphite hardening agents.

40 Claims, No Drawings

LATENT ACID CURABLE COMPOSITIONS

BACKGROUND OF THE INVENTION

(a) Field of the Invention

This invention relates to aryl phosphite latent acid catalysts which provide controlled work time for hardening phenolic resins at ambient temperature and which can provide extended work times at ambient temperature with rapid cure at modestly higher temperatures. The phenolic resins are those which are hardenable by strong acids at ambient temperature.

(b) Description of the Prior Art

Phenolic resins can be cured (hardened) at ambient temperatures of about 16° C. to about 38° C. by: using strong acids such as phosphoric or sulfuric acids; organic esters at pH of about 12 to 13 (ester cure process); or by using lightburned magnesium oxide, with or without, an organic ester at pH of about 8.5 to 9. Hardening with strong acids has major limitations, i.e., difficulty to control, cannot easily afford extensive ambient temperature stability prior to hardening, creates corrosion problems and are very unstable when furfuryl alcohol is employed with the phenolic resin.

The ester cure process is generally characterized by high water contents such as that of up to about 50% in the resin and very high alkali contents with about 8% potassium ion being typical. High alkali ion content is unsuitable for preparation of polymer concretes using siliceous aggregate or as a binder for refractory composites, and results in high leachability upon exposure to water. The high water content, when the highly alkaline resin is used at levels well above the 5% to 15% based on aggregate normally used in foundry applications, affords composites with decreased density and can be characterized by undesirable exudate since they bleed liquor.

Ambient temperature curing, also referred to as ambient temperature hardening, using organic ester and lightburned magnesium oxide as hardener has several important shortcomings relative to the process of the instant invention. These shortcomings include: use of three components instead of two; work time, i,e., mix life, is very limited even in the presence of retarders; and only a very limited cure is obtained after 24 hours of room temperature hardening. This limited cure can lead to thermoplasticity at temperatures of about 60° C. to 80° C. after room temperature hardening and it cannot be devoid of metal ions. The two component system which uses lightburned magnesium oxide without ester as hardener has many of the same shortcomings as that of lightburned magnesium oxide with ester.

It has now been found that the aryl phosphites of this invention are particularly effective hardening agents for both ambient temperature hardening or rapid hardening at relatively modest elevated temperatures such as those of from about 50° C. to 100° C. or less such as from 50° C. to 80° C.

SUMMARY OF THE INVENTION

In one aspect, this invention provides aryl phosphite hardeners for phenolic resins which have a wide range of hardening reaction rates and can be used as ambient temperature hardening agents or hardening agents at modestly elevated temperatures while providing adequate work times and rapid cures as desired.

In another aspect, this invention provides a method and composition for hardening phenolic resins at ambient temperature by use of diaryl hydrogen phosphites or partially pre-hydrolyzed triaryl or monoalkyl diaryl phosphites.

In a further aspect there is provided a means for regulating the rate of hardening of phenolic resins with the aryl phosphite hardeners by use of selected additives or by pre-treatment of the hardener, or by a combination of the two means.

In a still further aspect, the invention provides compositions wherein the resin is metal free or contains less than 0.5% of alkali metal or alkaline earth metal based on the weight of resin.

In yet another aspect there is provided an acid hardenable phenolic resin composition which is hardened with an aryl phosphite at ambient temperatures and the hardened composition displays excellent weight retention on being subsequently heated to at least 100° C.

In yet a further aspect, this invention provides compositions having a high degree of fire-retardency.

In yet a still further aspect of this invention, the ambient temperature hardened composition is heated at temperatures above 50° C. to rid the composition of residual volatile material and to provide improvement in tensile strength.

Additional aspects of the invention will become evident upon a reading of the specification and claims.

The compositions of this invention are particularly useful as binders, to prepare polymer (resin) concrete, refractory compositions such as castables, chemically resistant floor overlays, prepreg materials, fiber composites, reaction injection molding (RIM) composites, coated and bonded abrasives, coatings for metal containers and fire-retardant coated fibers, fabrics and laminates.

DETAILED DESCRIPTION OF THE INVENTION

The term "room temperature" is used herein to mean temperatures of about 16° C. to 32° C., particularly about 18° C. to 27° C. The term "ambient temperature" is used herein to mean a temperature of about 16° C. to 40° C. and preferably from about 16° C. to 35° C.

The term "work time" is the time after mixing of the composition during which the composition remains fluid or can be troweled, molded, etc. Also, "work time" is the period after mixing the composition during which the formation of a shaped article which is subsequently hardened does not show significant loss of density and strength in relation to shaping of such article immediately after mixing.

The terms "hardening" and "curing" are used interchangeably herein.

The term "partially pre-solvolyzed", as it relates to the phosphites of this invention means that from about 1% to 10% of water, lower alkanol, or lower glycol has been mixed therein to cause reaction with the phosphite. After reaction, the mixture appears homogeneous in relation to any free water, alkanol, or glycol in the mixture In case water is used for partially pre-solvolyzing the phosphite, the resulting product is referred to as partially pre-hydrolyzed.

The term "total water content" means the water in the resin as well as additional water in the composition which is available for reacting with and hydrolyzing the phenolic phosphite, e.g. moisture on the aggregate or water added to the composition which has not otherwise reacted to become unavailable for the hydrolysis reaction. Generally, all or most of the total water content will be supplied by the resin.

The Aryl Phosphite Hardeners

The aryl phosphite hardeners of this invention are esters of phosphorous acid which have: two aromatic organic ester groups and an acid hydrogen, three aromatic ester groups, or two aromatic ester groups and one alkyl group. Illustratively, the hardener can be a disubstituted phosphorous acid ester such as diphenyl hydrogen phosphite or a phosphorous acid ester which is trisubstituted such as triphenyl phosphite or diphenyl n-butyl phosphite.

In the presence of water, the aryl phosphites of this invention hydrolyze in a controllable manner over a period of time to stronger acidic products and eventually to phosphorous acid. Phosphorous acid is a strong acid having an ionization constant $pK_a$ of 1.20. Phosphorous acid is sufficiently acidic to provide room temperature hardening of phenolic resins. Illustratively, in the complete hydrolysis of one mole of diphenyl butyl phosphite, there would be produced one mole of phosphorous acid, one mole of butanol and two moles of phenol. The phenol which is split off of the phosphite on hydrolysis acts as a reactive diluent in the subsequent hardening of the resin whereas the butanol appears to act as a retarder in the hardening reaction.

The aryl phosphite hardening agents of this invention can be represented by the general formula

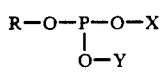

wherein each R and X is aryl, O is oxygen, P is trivalent phosphorus, and Y is hydrogen, aryl, or alkyl. Preferably, each aryl group has from 6 to 12 carbon atoms, particularly 6 to 7 carbon atoms, and the alkyl has from 1 to 12 carbon atoms, particularly about 1 to 8 carbon atoms. Each of the above alkyl and aryl groups can be further substituted with from 1 to 2 substituents such as halogen, nitro, alkyl of 1 to 4 carbon atoms, hydroxy, alkoxy of 1 to 4 carbon atoms and cyano. Illustratively, in the case of triphenyl phosphite, each of R, X, and Y of the above formula are phenyl; whereas in the case of diphenyl hydrogen phosphite R is phenyl, X is phenyl and Y is hydrogen. The aryl phosphites having two ester groups and a hydrogen atom, e.g., diphenyl hydrogen phosphite, are also referred to herein and in the literature as simply by the name of the ester groups and omit the hydrogen, e.g., diphenyl phosphite.

Illustrative of the aryl phosphite hardeners used in this invention there can be mentioned: diphenyl hydrogen phosphite; dicresyl, preferably meta or para, hydrogen phosphite; phenyl p-cresyl hydrogen phosphite; phenyl m-cresyl hydrogen phosphite; dinaphthyl hydrogen phosphite; diphenyl isopropyl phosphite; diphenyl methyl phosphite, di(p-cresyl) D-hexyl phosphite, triphenyl phosphite, tri(m-cresyl) phosphite, diphenyl isooctyl phosphite, diphenyl 2-ethylhexyl phosphite, diphenyl isodecyl phosphite, diphenyl cyclohexyl phosphite, 2-chloroethyl diphenyl phosphite, and the like.

The work time of the resin can vary over a broad range by varying the total water content, the use of retarder or accelerator additives, the specific phosphite hardening agent, and its quantity.

Ambient Temperature Hardening Compositions

The room or ambient temperature hardening compositions of this invention will preferably have a work time of at least 15 minutes and up to about 45 minutes. For ambient temperature hardening, a composition consisting of resin and 13% by weight of aryl phosphite wherein the total water content of the composition is one part of water for each part by weight of aryl phosphite, preferably attain a Shore D hardness of at least 25 within 24 hours after mixing at a temperature of about 23° C. The Shore D hardness is measured by use of a Durometer Type D of the Shore Instrument & Manufacturing Company located in New York. Another test for ambient temperature hardening is measured by use of a stick applicator wherein the composition consisting of the phenolic resin, aryl phosphite and water is "stick hard" as described in the Qualitative Flow Procedure set forth hereafter within 24 hours or less after mixing.

The ambient temperature hardening compositions are preferably those having either a diaryl hydrogen phosphite, a triaryl phosphite or a diaryl monoalkyl phosphite wherein the triaryl phosphite or diaryl monoalkyl phosphite is pre-hydrolyzed with from about 1% to 10% of water based on the weight of the aryl phosphite. Generally, the phosphites having 3 organic substituents are too slow to harden at ambient temperature within practicable time periods unless they have been pre-hydrolyzed or formulated with accelerators. Also, such trisubstituted phosphites are incompatible in resins having 10% or more water and in many cases are incompatible even with resin containing less than 10% water unless they are pre-solvolyzed with water, alkanol or glycol.

Hardening at Moderately Elevated Temperatures

Aryl phosphites having three organic substituents, such as triaryl phosphites or diaryl monoalkyl phosphites, are preferably used as latent hardeners to provide extended periods of stability at ambient temperature for the hardenable compositions and rapid hardening at moderately elevated temperatures such as those not above 100° C., e.g., about 50° C. to 95° C. Thus, such hardeners can remain fluid for a period of 4 hours or more at a temperature of about 23° C. but cure rapidly at the higher temperatures. However, by use of low concentrations of diaryl hydrogen phosphites, or small concentrations of water or with retarders, diaryl hydrogen phosphites as well as the pre-hydrolyzed triaryl phosphites or prehydrolysed diaryl monoalkyl phosphites can also have extended periods of ambient temperature stability and then be rapidly hardened at moderately elevated temperatures.

The viscosity of the basic ingredients, i.e., phenolic resin, aryl phosphite, and water, for the trisubstituted aryl phosphites are capable of remaining flowable at ambient temperature for a period of at least four hours.

The quantity of the phosphite hardener used in this invention can vary over a wide range. Typical levels, based on resin weight, are that of at least about 3% such as that from about 3% to 20%, and preferably at least 5% such as about 5% to about 15% based on the weight of resin.

Pre-solvolysis of the Phosphite Hardener

Pre-solvolysis, i.e., hydrolysis or alcoholysis of the phosphites prior to being placed in the hardenable composition generally improves compatibility, at least for compounds wherein all three of the hydrogens on the phosphorous acid are substituted. Pre-hydrolysis enhances hardening activity whereas pre-alcoholysis can have a small enhancing effect with alkylene glycols of 2 to 4 carbon atoms, or a retarding effect, as with methanol or other alkanols of 2 to 4 carbon atoms. Alcohols that may be used for alcoholysis include methanol, ethanol, propanol, butanol, and diols having from about 2 to 4 carbon atoms such as ethylene glycol and 1,2-propylene glycol. Partial pre-solvolysis is obtained by reacting the aryl phosphite with about 1% to 10% of water or alcohol based on the weight of the aryl phosphite, e.g., by stirring or otherwise mixing the phosphite in contact with water or alcohol at room or slightly elevated temperatures. The end point of the pre-solvolysis reaction can generally be observed when the mixture of aryl phosphite and solvolysis agent appear homogeneous so that the solvolysis agent is not discernable in the composition. A preferred range of pre-solvolysis is the use of about 2% to 7% of the solvolysis agent based on the weight of the aryl phosphite. For diaryl hydrogen phosphites, pre-solvolysis can be accomplished by stirring the water or alcohol in the phosphite for a few minutes at room temperature. For the trisubstituted aryl phosphites it generally takes longer such as stirring the water or alcohol at room temperature for a few hours. Solvolysis can also take place in the hardenable compositions of this invention, but without stirring or vigorous mixing this can take a substantial period of time. Additionally, in the case of the trisubstituted aryl phosphites, e.g., triphenyl phosphite, the phosphite is generally not evenly distributed or at least difficult to distribute evenly in the hardenable composition due to incompatibility with the resin unless it is pre-solvolyzed. Such incompatibility causes uneven or incomplete hardening of the composition.

The Phenolic Resin

The phenolic resins used in this invention are those which are hardenable by acids. Also, the phenolic resins of this invention are thermosetting, i.e., they form an infusible three dimensional polymer upon application of heat. Such phenolic resins can be phenolic resole resins prepared with alkaline catalysts, the resins disclosed in U.S. Pat. No. 3,485,797 issued to Robbins on Dec. 23, 1969 which are characterized as having benzylic ether linkages prepared by metal ion catalysts, or modified phenolic resole resins such as those described in U.S. Pat. No. 4,740,535 of Apr. 26, 1988 to R. Iyer et al. Both the Iyer et al U.S. Pat. No. 4,740,535 and the Robins U.S. Pat. No. 3,485,797 are incorporated herein by reference in their entirety.

The phenolic resins can be phenol- formaldehyde resins or those wherein phenol is partially substituted by one or more phenolic compounds such as cresol, isopropylphenols, nonylphenols, resorcinol, 3,5-xylenol, bisphenol-A or other substituted phenols. The aldehyde portion can be partially replaced by acetaldehyde, furaldehyde or benzaldehyde. The preferred phenolic resin is the condensation product of phenol and formaldehyde.

The phenolic resole resins are produced by the reaction of a phenol and a molar excess of a phenol-reactive aldehyde typically in the presence of an alkali or alkaline earth metal compound as condensing catalyst. They can also be prepared by using a metal-free quaternary ammonium hydroxide or methoxide as the condensing catalyst. Resins produced by use of the metal-free catalysts can be metal free or contain less than about 0.5% by weight of metals such as alkali metals or alkaline earth metals. Examples of suitable metal-free hydroxides are tetramethylammonium hydroxide, 2-hydroxyethyl trimethylammonium hydroxide (choline base), and benzyl trimethylammonium hydroxide and corresponding methoxides such as tetramethylammonium methoxide. Metal-free systems are preferred as binders for ceramic and electronic applications. The amount of metal-free hydroxide used can vary from about 0.01 mole to 0.04 mole per one mole of phenol but is preferably about 0.01 to 0.025 mole per mole of phenol. Resoles prepared using ammonia, hexa, or organic amines as catalysts are not preferred because they are less stable, higher in viscosity, and contain an amine which will buffer the action of in-situ production of phosphorous acid.

Typically, the resole resin will be a phenol-formaldehyde resin produced by reacting phenol and formaldehyde under alkaline conditions in a molar ratio (phenol: formaldehyde) within the range of from about 1:1 to 1:3. A preferred molar ratio for use in this invention ranges from about one mole of the phenol for each mole of the aldehyde to about 1 mole of phenol for 2.2 moles of the aldehyde and particularly a range of phenol to aldehyde of 1 to 1.2 to 1 to 2.

The pH of the phenolic resin used in this invention will generally vary from about 4 to 9, preferably 4 to 7, and particularly a pH of 4.5 to 6.5. Resins having a pH substantially above 9 should be avoided because such high pH interferes with the subsequent acidity of the composition as the phosphite ester hydrolyzes.

Free phenol will typically be 3% to about 25% by weight of the resin with preferred levels being 10% to about 20%. The molecular weight of the resin will generally vary from about 200 to 2,000 weight average molecular weight with about 230 to about 600 being preferred. Free formaldehyde will typically vary from about 0.1% to 2% and preferably 0.3% to 1% by weight of the resin. The weight average molecular weight (MW) is measured using gel permeation chromatography and phenolic compounds and polystyrene standards. The sample for molecular weight determination is prepared as follows: the resin sample is dissolved in tetrahydrofuran and slightly acidified with 1 N hydrochloric or sulfuric acid and dried over anhydrous sodium sulfate. The salts which result are removed by filtration and the supernatant liquid is run through a gel permeation chromatograph.

The phenolic resin solids can vary over a broad range such as that of about 50% to 85% by weight of the phenolic resin and preferably from 60% to 75%. The quantity of solids is determined by placing a 3 gram sample in an aluminum cup, placing the cup in a circulating air oven maintained at 135° C. for 3 hours and weighing the residue.

The viscosity of the resin, can vary over a broad range such as that of about 50 to 3,000 cps at 25° C. Preferably, the viscosity varies from about 100 to 1,000 cps at 25° C. The viscosity measurements herein are given in centipoises (cps) as measured by a Brookfield RVF at 25° C. or by Gardner-Holt viscosities at 25° C. The Gardner-Holt viscosities which are in centistokes are multiplied by the specific gravity (generally about 1.2) to give the cps at 25° C.

Typically, water contents for the phenolic resole resins will be at least about 3% such as from about 3% to 20% by weight of the resin and preferably about 5% to 15% by weight of the resin.

The liquid portion of the resole resin is water or water together with a non-reactive solvent. Solvents in addition to water can be selected from alcohols of one to five carbon atoms, diacetone alcohol, glycols of 2 to 6 carbon atoms, mono- and dimethyl or butyl ethers of glycols, low molecular weight (200-600) polyethylene glycols and methyl ethers thereof, phenolics of 6 to 15 carbons, phenoxyethanol, aprotic solvents, e.g., dimethyl sulfoxide, tetramethylene sulfone, methyl ethyl ketone, methyl isobutyl ketone, cyclic ethers such as tetrahydrofuran and m-dioxolane, and the like. The quantity of monohydric alcohol or glycol, if used, should not exceed about 10% by weight of the resin since alkanols are fairly strong retarders whereas qlycols such as ethylene glycol are moderate accelerators of the hardening reaction. Also, various amides and ureas which are conventionally used as solvents for resole resins need to be used sparingly since they too act as retarders for the hardening of the resin with the aryl phosphites.

The quantity of resin used in the hardenable compositions of this invention can vary over a wide range depending on the proposed use of the hardenable composition. Thus, the quantity of resin can vary from about 1.5% by weight of the hardenable composition to over 70% by weight of the composition. For refractory use, the quantity of hardenable resin will generally vary from about 3% to 20% by weight of the refractory aggregate and particularly from about 5% to 15% of resin based on the weight of aggregate. For other uses such as prepregs, the quantity of resin can be much greater such as that of about 20% to 40% by weight of the prepreg.

pH Adjustment of Phenolic Resin

Lowering the pH of the phenolic resins to about 4 or above by use of acids that are as acidic or more acidic than phosphorous acid, i.e., acids having a $pK_a$ of 1.20 or less increases the hardening rate of the resin with the aryl phosphite in relation to the use of acids having a higher $pK_a$. Illustrative of acids which have a $pk_a$ of 1.2 or less there can be mentioned: sulfamic, oxalic, dichloroacetic, trichloroacetic, methanesufonic, sulfuric, hydrochloric and phenol sulfonic acids. Lowering the pH with acids which are less acidic than phosphorous, such as acetic, formic, benzoic, and salicylic acids leads to lower reactivity with the phosphite than when the acid is equal to or greater in acidity than phosphorous acid.

Water Content

The hardening reaction of this invention requires water in order to hydrolyze the aryl phosphite, e.g., eventually to phosphorous acid. The total water content in the composition, i.e. water available for hydrolyzing the phosphite, can vary over a broad range such as that of about 0.15 to 5 parts of water by weight for each part by weight of the aryl phosphite, preferably from about 0.3 to 3 parts of water by weight for each part of the phosphite. In the case of resole resins, there is generally present a sufficient quantity of water, e.g., at least 3% based on the weight of resin, to hydrolyze the aryl phosphite and such compositions contain the requisite total water content even though the water is part of the resole resin. The requisite total water content can come from any of the ingredients in the composition, e.g., the resole resin, or additional water can be added to the composition. Water used for pre-solvolysis is not part of the total water content since such water was used for hydrolysis of the aryl phosphite.

Fillers, Aggregates, and Modifiers

The compositions of this invention can include fillers, modifiers, and aggregates which are conventionally used with phenolic resins. The aggregate material may be a particulate material such as that in granular, powder, or flake form. Suitable aggregate materials include but are not limited to: alumina, zirconia, silica, zircon sand, olivine sand, silicon carbide, silicon nitride, boron nitride, bauxite, quartz, chromite, and corundum and mixtures thereof. For certain applications, low density aggregate materials such as vermiculite, perlite, and pumice are preferred. For other applications, preferable high density aggregates include: quartz sand, gravel, crushed rock, and broken brick. Sand, gravel, and crushed rock are preferred aggregates in polymer concrete.

Fillers such as mica, kaolin, wollastonite, and barites can be used in quantities of up to about 50% by weight of the formulated resin product. The quantity of such fillers can equal the quantity of the resin. Hollow microspheres of glass, phenolic resin, or ceramic can also be used in quantities of up to about 20% of the formulated resin product. Other optional modifiers, particularly in polymer concrete, include fibers such as steel, glass, polyester, polypropylene, carbon, silicon carbide, asbestos, wollastonite fibers, woven glass cloth or mats, and aromatic polyamides such as KELVAR aramid fiber, which is a trade mark of the DuPont company. The quantity of such fibers can vary over a wide range sufficient to improve the flexural strength of the composition.

For refractory use, the compositions of this invention will often include silicon and graphite. The amount of graphite generally varies from about 5% to 25% by weight of the aggregate and the quantity of silicon will generally vary from about 1% to 5% by weight of the aggregate. Novolacs are also a useful additive for refractory use and the quantity of novolac can range from about 5% to 30% and preferably from about 10 to 20% by weight of the acid hardenable resin.

Acid reactive aggregates, fillers and modifiers such as magnesite, calcium carbonate, metallic aluminum, and limestone are preferably avoided since they react under the acidic resin hardening conditions.

A wide variety of materials can be added with or dissolved in the phenolic resin. Reactive diluents are particularly advantageous in that they also increase the percent of hardenable matter in a cured composite which in turn increases density and strength and reduces permeability to solvents and chemicals. Reactive diluents such as nonylphenol improve impact resistance and modulus of elasticity. Other reactive diluents include phenolics, allylic and benzylic alcohols, acetals, s-trioxane, vinyl ethers, amido compounds and N-methylol and N-alkoxy derivatives thereof, Schiff bases (condensate of an aromatic aldehyde with an aromatic primary amine), and diphenylamine.

A preferred reactive diluent is furfuryl alcohol which can be used over a wide range of concentrations such as from about 5% to 100% and preferably from about 10% to about 50% based on the weight of the resin (B.O.R.). Furfuryl alcohol also acts as a hardening accelerator in that it decreases the time needed for hardening the phenolic resin.

Epoxy additives

Epoxy reactive diluents include linear terminal

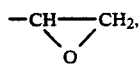

which are of the 1,2 type) and internal

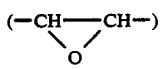

which can be linear or cycloaliphatic such as those of the formula

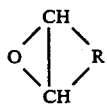

wherein R is part of a cycloaliphatic group having from 3 to 4 carbon atoms which can be substituted or unsubstituted such as with alkyl groups. It has been found that materials containing an internal epoxide group act as hardening retarders at ambient temperature.

Internal epoxy compounds of the cycloaliphatic type include: limonene monoxide; cyclohexene oxide; vinyl cyclohexene monoxide; 3,4-epoxycyclohexyl methyl-3,4-epoxy cyclohexane-carboxylate (ERL 4221 which is sold by Union Carbide Corp); and bis(3,4-epoxycyclohexyl)adipate (ERL-4299 which is sold by Union Carbide Corp.). Mixed epoxies, i.e., those containing 1,2- and cycloaliphatic epoxide groups, include vinyl cyclohexene dioxide, and limonene diepoxide. An example of an internal linear epoxide is methyl epoxy linseedate such as VIKOFLEX 9010 which is supplied by Atochem North America, Inc. Other internal epoxies include epoxidized vegetable oils and epoxidized unsaturated fatty acids and fatty esters. The quantity of epoxy used in the compositions of this invention can vary over a broad range such as that of about 1% to 10% or 20% B.O.R. with preferred levels of about 5% to 10% based on the weight of resin (B.O.R.).

Nitrogen Containing Additives

Nitrogen containing additives have many functions when used in the compositions of this invention. Nitrogen-containing additives with phosphorous compounds improve fire-retardency. Those with —NH— sites function as in-situ formaldehyde scavengers upon heating. Another important function of the nitrogen containing additives is for post in-situ neutralization of acid via hydrolysis of an amide or Schiff base to liberate ammonia or organic amine. Neutralization increases applicability with acid sensitive substrates.

Illustrative of nitrogen-containing material which can be used in the compositions of this invention there can be mentioned urea, biuret, ethyl carbamate, diethylolurea, dicyandiamide, glycoluril and its methylolated derivatives, and urea-type materials represented by the formula

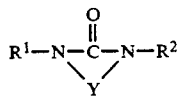

wherein $R^1$ and $R^2$ may be similar or dissimilar and are selected from hydrogen, methylol, methoxyalkyl wherein the alkyl has from 1 to 4 carbon atoms and Y is selected from ethylene, propylene,

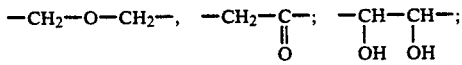

and 2 hydrogens wherein each hydrogen is attached to nitrogen. Additional nitrogen additives include saturated and unsaturated carboxylic acid amides such as formamide, acetamide, n-butyramide, acrylamide, acetoacetamide, cyanoacetamide, caprolactam, methacrylamide, salicylamide and N-methylol derivatives thereof, N,N'-methylenebisamides, salicylanilide, formanilide, and cyclic amides such as 2-pyrrolidinone, N-methyl-2-pyrrolidinone, N-vinylpyrrolidinone; Schiff bases including those derived from benzaldehyde and substituted benzaldehyde, and aniline, mono- and di-ring alkylated anilines with alkyl groups containing 1 to 4 carbon atoms, dodecylaniline; and diaryl amines such as diphenylamine. Ethylene urea is a preferred additive since, in contrast to other nitrogen additives, it does not retard the hardening process.

The quantity of the nitrogen containing additive, when used, can vary over a broad range such as that of about 1% to 10% by weight of the resin and preferably from about 2% to 7% by weight of the resin. Nitrogen containing additives will have a $pK_a$ of about 0 to 3 and preferably about 0 to 2. In comparison with aniline which has a $pK_a$ of 4.6 and triethylamine which has a $pK_a$ of 10.7, these additives are relatively weak bases or neutral.

Hardening Rate Accelerators and Retarders

It has been found that some additives accelerate the hardening reaction whereas others retard the hardening reaction. Thus, furfuryl alcohol significantly accelerates the hardening reaction and alkylene glycols of about 2 to 4 carbon atoms are modest accelerators. The following materials are preferred retarders: carboxylic acid amides; urea; dicyandiamide, N-methylolated amides, N-methylolated urea; N-alkyl 2-pyrrolidinones wherein the alkyl group contains from 1 to 4 carbon atoms; cycloaliphatic and other internal epoxies; Schiff bases and mixtures of the foregoing retarders. Apart from furfuryl alcohol which can generally be used in quantities well in excess of 10% based on the weight of resin, the remaining accelerators and retarders are generally used in quantities of from about 1% to 10% based on the weight of the resin.

Silanes

Silanes are preferably used with fillers or aggregates with surface hydroxyl sites. This include alumina, silica, glass fiber and cloth, acid resistant silicates, some specific silane are 3-glycidoxypropyl-trimethoxysilane, 2-[3,4-epoxycyclohexyl]ethyl-trimethoxysilane, and N-phenylaminopropyltrimethoxysilane. The quantity of silane can vary over a broad range such as that of 0.05% to 1% based on the weight of the resin.

In order that those skilled in the art may more fully understand the invention presented herein, the following procedures and examples are set forth. All parts and percentages in the examples, as well as elsewhere in this application, are by weight and temperatures are at 23° C., unless the context indicates otherwise. The time given for hardening reactions is the time starting from the time the mixture was prepared until the mixture hardens, unless the context indicates otherwise.

PROCEDURES, PREPARATION OF RESINS AND PROPERTIES (1) Resin A, is a phenolic resole resin prepared by reacting phenol and formaldehyde in a molar ratio of one mole of phenol for each 1.25 moles for formaldehyde in the presence of sodium hydroxide as catalyst. This resin had the following properties: a formaldehyde to phenol molar ratio (F/P) of 1.25; 71.0% solids; 17.0% of free phenol; 9.6% water; viscosity of about 318 cps at 25° C.; and a molecular weight (MW) of 207 for the weight average MW and 128 for the number average MW and a pH of 8.9.

(2) Resin B is a phenolic resole resin prepared in a similar manner to Resin A with 3 differences, namely, lower water content, higher viscosity, and lower pH due to neutralization with diphenyl hydrogen phosphite at the very end of its preparation. This resin was prepared with a F/P molar ratio of 1.25 and had the following properties: 69.4% solids; 16.8% of free phenol; 7.5% water; viscosity of 740 cps at 25° C.; a pH of 5.3; a weight average molecular weight of 249; and a number average molecular weight of 148.

(3) Resin C is metal-free resole resin and is prepared in a similar manner to Resin A using choline base catalyst instead of the NaOH used in preparation of Resin A and the pH is adjusted with salicylic acid and then furfuryl alcohol is added. Final furfuryl alcohol content was about 32% based on the weight of the resin. This resin had a resin solids content of 53.5%; 9.1% of phenol; 8.6% water; a viscosity of 60 cps at 25° C.; a pH of 5.3; a weight average molecular weight of 240; and a number average molecular weight of 141.

(4) Resin D is prepared in a similar manner to Resin A using a F/P molar ratio of 1.10 but is condensed to a higher molecular weight and higher viscosity and contains a low level of water and ethylene glycol of about 9% as cosolvent. This resin contained 79% solids; 12.9% phenol; 4.5% water; a viscosity of about 5800 cps at 25° C.; a weight average MW of 539; and a number average MW of 185.

(5) Resin E is a phenolic novolac resin prepared from 50% aqueous formaldehyde and phenol at a F/P molar ratio of 0.5 using oxalic acid as catalyst. The weight average molecular weight of this resin was about 600.

(6) Resin F is a phenol formaldehyde resole resin prepared by reacting phenol with 50% aqueous formaldehyde at a F/P molar ratio of 1.25 using sodium hydroxide as catalyst. This resin intermediate is formulated with acetic acid and methanol to provide Resin F which has: a viscosity at 25° C. of 2,560 Centistokes, or approximately 3,000 cps at 25° C.; 74% solids; 7% free phenol; 7% methanol; 12 % water; a pH of 5.8; and a weight average MW of 3,000.

(7) Resin G is a phenolic resole resin which is the sodium analog of Resin C with a F/P molar ratio of 1.25 and, as calculated, had the following properties: 54% solids; 10.1% free phenol; 9.6% water; a viscosity of about 60 cps at 25° C.; a pH of 6.5. and a weight average molecular weight (MW) of 326 and a number average MW of 157.

(8) Resin H is a resole resin having a F/P molar ratio of 1.25 and was prepared by use of sodium hydroxide catalyst. This resin had: 69.8% solids; 13.7% free phenol; 13.1% water; a viscosity of about 300 cps at 25° C.; a pH of B; a weiqht average MW of 326 and a number average MW of 157.

(9) Resin I is a resole resin prepared with choline base as the catalyst in a F/P molar ratio of 1.25 and had the following properties: 71% solids; 13.4% phenol; 12.7 % water; a viscosity of about 289 cps at 25° C.; a pH of 7.6; a weight average molecular weight of 240; and a number average MW of 141.

(10) Resin J is prepared by use of sodium hydroxide as catalyst for a resole resin havinq a F/P molar ratio of 1.25; 72.0% solids; 16.3% of free phenol; 7.4% water; a viscosity of about 670 cps at 25° C.; a weight average MW of 227; and a number average MW of 141.

PROCEDURE FOR DETERMINING EFFECT OF ADDITIVES ON QUALITATIVE FLOW OF PHENOLIC RESIN/PHOSPHITE CATALYST MIXES

This procedure is also referred to as "Qualitative Flow Procedure". All or parts of this procedure were used in many of the examples for determining flow and hardening rate of the mixtures. Also, definition of terms relating to flow or hardness are set forth herein. Unless otherwise indicated in the example involved, the overall procedure is as follows. Glass vials (28 mm ×57 mm) are char , additive and solvent, if any, as indicated in each example and after solution was effected, the phosphite catalyst was added and mixed well for one minute with a spatula. Relative viscosities of the mixes were observed by laying the vials at right angles, i.e., on their sides, at various intervals upon standing at room temperature (22°–24° C.). Unless otherwise indicated, the recorded time for the various observations and changes of viscosity are given from the time the mixes were prepared to the time of observation. All mixes were quite fluid initially but generally became immobile and tack-free in time. An early indication of viscosity increase is "cloudiness" and a still more advanced indication is that of the composition being "opaque".

Immobile mixes were probed with an applicator stick to determine relative degree of fluidity. With increasing viscosity, the fluidity of the composition range from "fluid" to a showing of stickiness on the stick which is referred to as "sticky" to a "taffy-like" tackiness and then to "tack-free" wherein the stick pulls out of the composition clean and free of resin. The tack-free condition is also referred to as "stick clean". "Stick hard" refers to a hardening of the composition so that the applicator stick bends or breaks on trying to penetrate the composition also referred to as a "mix". The applicator sticks are long grain birch wood, of 2 millimeters in diameter and are supplied by American Scientific Products (McGram Pk, Il. Cat. No. A-5000-1). Additionally, in many instances comparative viscosity increases were recorded, e.g., 3>2>1 means that the viscosity of Mix 3 was higher or greater than (>) that of Mix 2 which in turn was greater than Mix 1. The use of more than one greater than symbol "(>)" indicates a greater difference, i.e., viscosity increase, as compared to the use of simply one "(>)" symbol. ≧ means equal to or slightly greater than and "(<)" means less than.

EXAMPLE 1

Effect Of Additives On Qualitative Flow During Hardening Of Resole Resin B With Diphenyl Hydrogen Phosphite (DPP) At Room Temperature (22°-24° C.)

Each Mix consisted of: 4 g (grams) of resole Resin B; 0.16 g of added water which is 4% based on the weight of the resin (B.O.R.); the additive at the percentage concentration (B.O.R.) set forth in parenthesis after the name of the additive in TABLE 1; and the last ingredient to be placed in the Mix was 0.52 g of diphenyl hydrogen phosphite (DPP) (13% B.O.R.), specifically, Doverphos 213 of Dover Chemical Company. The total water content was 0.9 parts for each part by weight of the phenolic phosphite. The 0.9:1 ratio is obtained by adding the 0.3 g of water in the resin with the 0.16 g of added water and dividing this by the quantity of the aryl phosphite, namely, 0.52 g. TABLE 1 sets forth approximate time in hours it took for each Mix to show the various increasing conditions of viscosity as set forth in the qualitative flow procedure. The data of the Control (Mix 1) was based on 5 trials.

It can be seen from TABLE 1 that some of the effects of specific additives on DPP hardening of the resin were as follows: Mix 14 which contained urea, Mix 9 and Mix 10 which contained N-benzylideneaniline were very effective retarders of the hardening reaction; Mix 7 which contained limonene monoxide was a retarder; Mix 5 which contained ethylene urea was a mild accelerator; Mix 15, the VIKOFLEX 9010 was a retarder; Mix 6, formamide was a very strong retarder; and, Mix 12, N-methyl-2-pyrrolidinone was a retarder.

TABLE 1

EFFECT OF ADDITIVES ON HARDENING OF RESOLE RESIN B WITH DIPHENYL HYDROGEN PHOSPHITE (DPP). QUALITATIVE FLOW STUDIES AT ROOM TEMPERATURE (ABOUT 22° C. TO 24° C.)

| | | Approximate Time (hrs) To Become Increasingly Viscous or Hard | | |
|---|---|---|---|---|
| Mix | Additive (% B.O.R.) | Cloudy | Tack-free | Stick hard |
| 1 | None (Control) | 5–5.75 | 8–10.75 | 12.25–14 |
| 2 | Dicyandiamide (2) | 7.75 | 14 | >21, <29 |
| 3 | 2,6-Dimethylol-p-cresol (5) | 5.75 | 10.75 | 12.25 |
| 4 | Diphenylamine (5) | 8 | 12 | ≦22 |
| 5 | Ethylene urea (2) | 5–5.5 | 9 | 11.5 |
| 6 | Formamide (5) | ≧29 | >6 days | — |
| 7 | Limonene monoxide (5) | 9–10.5 | >12, <22 | 23 |
| 8 | Methacrylamide (5) | 6.5 | 12 | ≧19 |
| 9 | N-Benzylidineaniline(2) | 8–8.5 | 15 | 24 |
| 10 | N-Benzylideneaniline(5) | 10, 12.5 | 20, 27.5 | 43, 46 |
| 11 | N-Methylolacrylamide (5) | 5.75 | 10.25 | >14, <19 |
| 12 | N-Methyl-2-pyrrolidinone(5) | — | >14, <21 | 33.5 |
| 13 | N-Vinyl-2-pyrrolidinone(5) | — | 12.25 | ≦21 |
| 14 | Urea (2) | 8, 9 | 12.5, 13 | 20–24 |
| 15 | VIKOFLEX 9010* (5) | 8 | >12, <22 | 22 |

*VIKOFLEX 9010 is a trademark of Atochem North America, Inc. for methyl epoxy linseedate.

EXAMPLE 2

Effect Of Additives On Hardening Of Resole Resin B With Diphenyl Hydrogen Phosphite (DPP) At 65° C.

The principal object of this example was to determine the approximate time, in minutes, required for a Mix to become "stick hard" after the Mix was placed in an oven maintained at 65° C.

The formulation for each Mix in this example was the same as that of EXAMPLE 1 except that 1 g of each Mix was transferred to a small glass vial which was placed in a 65° C. oven. Time to become "stick hard" while hot as defined in Qualitative Flow Procedure was observed.

It can be seen from the previous TABLE 1 and the following TABLE 2 that only a few of the materials which were retarders for hardening at room temperature as shown in TABLE 1 had retarding effects at 65° C. as shown in TABLE 2. Amides such as urea, N-methylolacrylamide, methacrylamide, N-substituted-2-pyrrolidinones, and cycloaliphatic epoxies exert a retarding effect on room temperature hardening but have little or no effect on hardening at 65° C.

TABLE 2

EFFECT OF ADDITIVES ON HARDENING OF RESOLE RESIN B WITH DIPHENYL HYDROGEN PHOSPHITE (DPP) AT 65° C.

| Mix | Additive (% B.O.R.) | Approximate Time (min) To Become Stick Hard At 65° C. |
|---|---|---|
| 1 | None (Control) | 10–15 |
| 2 | Dicyandiamide (2) | 21 |
| 3 | 2,6-Dimethylol-p-cresol(5) | 15 |
| 4 | Diphenylamine (5) | 15 |
| 5 | Ethylene urea (2) | 15 |
| 6 | Formamide (5) | >46 hours |
| 7 | Limonene monoxide (5) | 15 |
| 8 | Methacrylamide (5) | 15 |
| 9 | N-Benzylidineaniline(2) | ≦30 |
| 10 | N-Benzylideneaniline(5) | >30, ≦60 |
| 11 | N-Methylolacrylamide(5) | 15 |
| 12 | N-Methyl-2-pyrrolidinone (5) | 15 |
| 13 | N-Vinyl-2-pyrrolidinone(5) | 15 |
| 14 | Urea (2) | 15 |
| 15 | VIKOFLEX 9010 (5) | — |
| 16 | Formamide (1) | 30 |

EXAMPLE 3

Effect Of Additives On Viscosity During Hardening Of Resole Resin B With Diphenyl Hydrogen Phosphite Catalyst At 25° C.

This example was performed to show the effect of various additives on the change in viscosity at certain times during hardening of resole Resin B with diphenyl hydrogen phosphite (DPP) at 25° C. The results of this example are set forth in TABLE 3 wherein viscosity measurements at 25° C. were made at certain times, set forth in hours (H) and the viscosity is given in centistokes. The right hand side of TABLE 3 provides the time required, in minutes, to attain "stick hard" of some of the mixes. Unless indicated otherwise, each Mix consisted of : 10 g resin; 0.4 g added water (4% B.O.R.); 1.28 g DPP (12.8% B.O.R.); and additive, if any, as indicated for the mix involved. The total water content of each mix was 0.9 parts of water per part of the aryl phosphite.

The additive for each Mix and its concentration in percent (B.O.R.) was as follows wherein the concentration of additive is given in parenthesis after the name of the additive.

Mix 1 had no additive and was the Control.

Mix 2 had no additive but contained 20% of DPP, B.O.R. instead of the 12.8% as in Mix 1.

Mix 3 had no additive, water was not added to the resin and the concentration of DPP was 5% B.O.R.

Mix 4 had no additive but the DPP was pre-treated with 3% water based on the weight of DPP by stirring for about 3 minutes and then allowing the solution to stand for about an hour. It should be noted that the reading under the 4 hour column was obtained after only 3 hours.

Mix 5 used ERL 4221 (5%) as the additive. ERL 4221 is a cycloaliphatic diepoxide of Union Carbide Corp.

Mix 6 used formamide (1%) as the additive.

Mix 7 used limonene monoxide (5%) as the additive

Mix 8 did not use DPP but instead added phenol at 6.3% B.O.R. and the additive was maleic acid (6.5%). This was done to simulate hydrolyzed phenyl hydrogen maleate. Mix 8 was taffy-like after 24 hours and tack-free after 30 hours.

added water (Mix 3) provides prolonged room temperature stability with only a 26% viscosity increase after 6 hours; pre-hydrolysis of DPP (Mix 4) increases hardening rate; vinyl ethers (Mixes 16 and 17), phenyl dioxolane (Mix 10), and epoxy additives (cycloaliphatic, Mix 12 and internal linear, Mix 11) prolong hardening at 25° C. but have little effect on hardening at 65° C.; ethylene urea has little effect at room temperature at 4% B.O.R. (Mix 15) but exerts an accelerating effect at 2% B.O.R. (Mix 14); phenol and maleic acid additives (Mix 8) simulate hydrolysis products of phenyl hydrogen maleate but this mix shows that maleic acid, which has a first ionization constant of $pK_a$ 1.9, is relatively ineffective at 25° C. relative to control (DPP of Mix 1) which produces in-situ the stronger phosphorus acid.

TABLE 3
EFFECT OF ADDITIVES ON VISCOSITY CHANGES DURING HARDENING OF RESOLE RESIN B WITH DIPHENYL HYDROGEN PHOSPHITE

| MIX | VISCOSITY IN CENTISTOKES | | | | | | | Approx. Min. For "Stick Hard" At 65° C. |
|---|---|---|---|---|---|---|---|---|
| | 0(H) | 2 | 4 | 5 | 5.5 | 6 | 6.5 | 7 | |
| 1 | 200 | 275 | 946 | 2270 | 4100 | 7218 | >14800 | — | 10 |
| 2 | 173 | 253 | 4293 | Completely opaque at 4.5 hrs. | | | | | |
| 3 | 550 | 569 | 602 | 620 | — | 692 | — | 756 | >30, ≦60 |
| 4 | 238 | 1008 | 4630 | 6340 (at 4.5H) Opaque | | | | | |
| 5 | 238 | 365 | 602 | 1024 | 1350 | 1820 | 2700 | 4378 | |
| 6 | 188 | 258 | 852 | 1820 | 2592 | 4378 | 7218 | 11090 | 30 |
| 7 | 200 | 269 | 500 | 908 | 1235 | 1760 | 2413 | 2815 | 15 |
| 8 | 250 | 500 | 820 | 977 | 1125 | 1235 | 1408 | 1603* | |
| 9 | 300 | 383 | 1047 | 2206 | 3390 | 5770 | >9850* | | |
| 10 | 177 | 253 | 852 | 1642 | 2324 | 3957 | 7218* | | 15 |
| 11 | 191 | 275 | 852 | 1428 | 2206 | 3620 | 5912 | >9850* | |
| 12 | 165 | 250 | 459 | 798 | 1070 | 1603 | 2378 | 3390* | |
| 13 | 1290 | 1603 | 2015 | 2485 | — | 3390 | 4293 | 5485* | |
| 14 | 213 | 335 | 1525 | 4504 | 9850 | >14800 | — | — | |
| 15 | 225 | 330 | 1217 | 2646 | 4630 | 8970* | 14800 | — | 15 |
| 16 | 225 | 260 | 852 | 1642 | — | 4630 | 7509* | >14800 | 16 |
| 17 | 219 | 294 | 946 | 1973 | 2815 | 5485 | 11,500* | >14800 | 17 |

*Mostly cloudy

Mix 9 used a novolac resin (15%) having a weight average molecular weight of about 600 as the additive and an additional quantity of 5.5 % B.O.R. water was added.

Mix 10 used 2-phenyl-1,3-dioxolane (5%) as the additive.

Mix 11 used VIKOFLEX 9010 (5%) as the additive. VIKOFLEX 9010 is an epoxidized methyl linseedate sold by Atochem North America, Inc.

Mix 12 used vinyl cyclohexene monoxide (5%) as the additive. A reading at 8 hours showed that the Mix was opaque.

Mix 13 used Resin D instead of Resin B, it did not use an additive but the resin was pre-neutralized with 1.5% DPP, B.O.R., diluted with 2% B.O.R. of water which replaced an equal part of the resin and no added water was used. An additional reading after 8 hours from mixing showed a viscosity of greater than 9850 centistokes.

Mix 14 used ethylene urea (2%) as the additive. This mix was opaque at the 6 hour reading.

Mix 15 used ethylene urea (4%) as the additive. This mix was opaque at 6.33 hours.

Mix 16 used 4-hydroxybutyl vinyl ether as the additive (5.5%). A reading taken at 7 hours showed that the mix was opaque.

Mix 17 used butoxyethyl vinyl ether (5.5) as the additive.

It can be seen from TABLE 3 that: increasing the level of DPP from 12.8% to 20% (Mixes 1 and 2) significantly increases hardening; use of 5% DPP with no

EXAMPLE 4

Preparation of Polymer Concrete With Diphenyl Hydrogen Phosphite As Latent Acid Hardener Three plastic beakers were each charged with 100 g (grams sands (66 g coarse, 24 g medium, and 10 g fines) with Resin I. Each mix initially contained: 13 g resin or resin/furfuryl alcohol as indicated below and 0.13 g epoxysilane (A-187 of Union Carbide Corp.). These ingredients were mixed well with 1.6 g of diphenyl hydrogen phosphite (DOVERPHOS 213) which had been pre-hydrolyzed with 2% or 5%, as indicated below, of water based on the quantity of the phosphite. The compositions were mixed well and then about 94 g was transferred to a 60 ml (milliliter) plastic beaker, tapped well to consolidate the mix and allowed to set at room temperature (about 23° C.).

Mix 1 was made at 8:55 AM on Day 1 and contained the resin together with 0.13 g of salicylic acid (1% B.O.R.) and the diphenyl phosphite (DPP) had been pre-hydrolyzed with 5% of water based on the weight of DPP.

Mix 2 was made at 10:05 AM on Day 1 and used 13 g of the resin which had been pre-treated with 2% of DPP based on the weight of resin. The treated resin had a Gardner viscosity at 25° C. of approximately 270 centistokes and a pH of 4.2.

Mix 3 was made at 1:40 PM on Day 1 and was the same a Mix 2 but 1.0 g of the resin was replaced with 1.0 g of furfuryl alcohol (FA).

It was found that the workability of Mix 1 was about 15 to 20 minutes but was somewhat greater with Mix 2 and Mix 3. This was determined, in each instance, by placing the mix in a 250 ml. plastic beaker and stirring the mix with a tongue depressor until the rheology of the resin and sand mix had changed due to impeded flow.

At 3:50 PM of Day 1 hardened masses of Mix 1 and Mix 2 were demolded. At 6:20 PM of Day 1 a black hardened mass was demolded from Mix 3. Mix 3 was placed in an oven for one hour at 80° C. At 8:20 AM of Day 2, i.e., the following morning, all concretes appeared hard and very sound. This example shows that phenolic resin concretes can be easily prepared using resole resin with or without the presence of furfuryl alcohol and partially prehydrolyzed DPP.

EXAMPLE 5

Effect Of Substituting Portion Of Diphenyl Hydrogen Phosphite With Triphenyl Phosphite On Hardening Of Resin C At 1:18 PM of Day 1 a vial was charged with 4.0 g of Resin C and 0.5 g of DPP for Mix 1 and another vial with 4.0 g of Resin C and 0.25 g of DPP and 0.25 g of triphenyl phosphite. The mixes contained 0.7 parts of total water content per part by weight of the aryl phosphite. At 4:05 PM of Day 1 Mix 1 was very dark and luke warm. At 5:00 PM of Day 1 Mix 2 was amber and quite fluid. The temperature was about 23° C. during the entire experiment except that from 5:00 PM to 6:15 PM of Day 1 the ambient temperature was about 25° C. At 8:30 AM of Day 2, Mix 1 was stick hard whereas Mix 2 was not stick hard. It can be seen that the rate of hardening of triphenyl phosphite was less than that of DPP.

EXAMPLE 6

Comparison Of One Day Room Temperature Cure With Post Thermal Cure Regarding Weight Change And Hardness 11 g of a solution prepared from 10.0 g of Resin B, 0.4 g water, and 1.28 of diphenyl hydrogen phosphite (DOVERPHOS 213) was charged to a 60 m. plastic beaker which was stirred, covered, and then allowed to stand for 24 hours at about 23° C. A hardened light cream colored disc was removed having a weight of 10.9 g. A Shore D Durometer hardness of this sample had an average reading of 65. The disc which was 5/16 of an inch thick and 1 and ⅜ inches in diameter and weighed 10.66 g was placed in an oven for 2 hours and maintained at 80° C. The weight loss was 0.6%. The hardness was again measured and found to be about 69. The disc was placed back in the oven and the temperature was raised to 100° C. and maintained there for 2 hours. The weight change by the post thermal cure was a loss of 0.5%. Thus, the total weight change by the post thermal cure was a loss of about 1%. It can be seen that a high degree of hardening is attained after 24 hours at 23° C. with the diphenyl hydrogen phosphite hardener and that very little loss in weight occurs by post thermal treatment up to 100° C. for the room temperature hardened material.

EXAMPLE 7

Attempted Hardening Of Resin B With Triphenyl Phosphate

A composition was prepared on Day 1 by mixing 10.0 g of Resin B, 1.28 g of triphenyl phosphate, and 0.4 g of water which was added last to the mixture. The composition had a total water content of 0.9 per part by weight of the phosphate. The triphenyl phosphate in this case was completely miscible in the composition in contrast to triphenyl phosphite which needs to be partially hydrolyzed for miscibility in the resin. The Gardner viscosity at 25° C. only changed from 220 centistokes to 225 centistokes over a period of 20 hours at about 23° C. On Day 7 the solution was still very fluid at 23° C. . After 9 weeks, the solution at 23° C. was clear and moderately viscous. It can be seen that the composition is not room temperature active.

On Day 2 a portion of the composition was used for testing at 65° C. A 1 g solution of the composition was placed in a small vial and the vial placed in an oven maintained at 65° C. After 2 hours at 65° C. the solution was still clear and very fluid. There was no change in the solution after 5 hours at 65° C. After 24 hours the solution was still clear and very fluid. After 26 hours at 65° C. the mixture was slightly cloudy. After 30 hours at 65° C. the mixture was cloudy and syrupy and this continued after 32 hours. The mixture was then cooled to 23° C. and it yielded a completely opaque, fairly viscous mixture. After a further 2.5 days at 23° C. the sample remained unchanged.

It can be seen from this example that triphenyl phosphate, unlike untreated triphenyl phosphite is completely miscible with Resin B which included 2% of additional water. It very slowly acts as hardener at 65° C. but is ineffective at 23° C. for at least nine weeks.

EXAMPLE 8

Hardening Of Resin B With Diphenyl Hydrogen Phosphite At 50° C.

Two mixes were prepared. Mix 1 was composed of 4.0 g of Resin B, 0.16 g of added water(4% B.O.R.) AND 0.51 g of diphenyl hydrogen phosphite 12.8% B.O.R. (DOVERPHOS 213). Mix 2 was composed of 4.0 of Resin B, and 0.20 of diphenyl hydrogen phosphite (5% B.O.R.). 1.0 g each of Mix 1 and Mix 2 was placed in a small glass vial which was capped and placed in a water bath at 50°-52° C. at 9:00 AM and observed as a function of time. The results of this example are set forth in TABLE 8.

It can be seen from TABLE 8 that addition of a small amount of water and the higher level (12.8% B.O.R.) of DPP leads to good reactivity at 50°-52° C. Considerably lower reactivity (3.5 hours versus 1.33 hours) results when less DPP is employed with no added water.

TABLE 8

| HARDENING OF RESIN B WITH DIPHENYL PHOSPHITE AT 50° C. | |
| --- | --- |
| Minutes Elapsed | Order of Viscosity Increase for the Various Mixes |
| 30 | Mix 1 was mostly opaque and viscous while hot. |
| 50 | Mix 2 was clear and fluid whereas Mix 1 was firm but not hard while hot. |
| 65 | Mix 1 was close to stick hard while hot. |
| 80 | Mix 1 was stick hard. Mix 2 was clear and moderately viscous while hot. |
| 92 | Mix 2 was opaque and very viscous. |
| 120 | Mix 2 was taffy-like. |

TABLE 8-continued

HARDENING OF RESIN B WITH DIPHENYL PHOSPHITE AT 50° C.

| Minutes Elapsed | Order of Viscosity Increase for the Various Mixes |
|---|---|
| 143 | Mix 2 was firm but penetrable. |
| 180 | Mix 2 was close to being stick hard. |
| 220 | Mix 2 was stick hard while hot. |

EXAMPLE 9

Hardening Of Ceramic Aggregate With Resole Resin I

Mix 1 was prepared by mixing 34 g of silicon carbide having a grit size of 500 (15 microns) with 2 g water and 11 g of Resin I. These were mixed well and then 1.5 g of diphenyl hydrogen phosphite (about 5.45 mmole) (molecular weight 234 but at about 15% free phenol is corrected to about 275). This sample was prepared at 1:30 PM on Day 1. Mix 2 was prepared by mixing 34 g of silicon carbide having a grit size of 500 (15 microns) with 2 g of furfuryl alcohol, 11 g of Resin I and 1.5 g of diphenyl hydrogen phosphite (about 0.0054 moles as diphenyl hydrogen phosphite). Mix 2 was prepared at 1:41 PM on Day 1. Both mixes exhibited mild exotherms within half an hour after mixing and showed significant viscosity increase after 3 hours. At 8:30 AM on Day 2, i.e., the following morning, the mixes were quite firm with Mix 2 being harder but both could be indented with fingernail. At 10:00 PM of Day 2 the mixes could not be indented with the fingernail.

It can be seen that replacement of added water by furfuryl alcohol improves hardening with the phosphite hardener.

EXAMPLE 10

Ceramic Aggregate Hardened With Resole Resin I Using Diphenyl Hydrogen Phosphite Mix 1 was prepared by mixing 34 g of silicon carbide having a grit size of 500 with 4 g of furfuryl alcohol after which 9 g of Resin I was mixed in and finally 1 g of diphenyl hydrogen phosphite was mixed in to the composition. Mix 1 was prepared at 8:30 AM of Day 1. At 10:30 AM of Day 1, Mix 1 flowed very slowly. At 11:15 AM of Day 1, Mix 1 was not stick clean. Mix 2 was prepared in a manner similar to Mix 1 but used 1.5 g of DPP. Mix 2 was prepared at 9:40 AM of Day 1. At 10:30 AM of Day 1, Mix 2 showed stick clean and was luke warm. Mix 3 was prepared by mixing 34 q of aluminum oxide of 500 grit size with 4.5 g of furfuryl alcohol. Into these 2 ingredients there was mixed 10 g of Resin I and 1.5 g of diphenyl hydrogen phosphite. Mix 3 was prepared at 9:43 AM of Day 1. At 10:30 of Day 1, Mix 3 showed stick clean, was warm, and softer than Mix 2. Mix 4 was prepared by replacing 1 g of furfuryl alcohol by CYMEL 301 (a hexamethoxymethylmelamine of American Cyanamid). Mix 4 was prepared at 11:00 AM of Day 1. At 12:30 PM of Day 1, mix 4 showed significant flow. At 1:30 PM of Day 1, Mix 2 was hardest and could be stripped out of a cup. At 4:30 PM of Day 1, increasing mix hardness was 2>3>1>>4. Mix 4 was still barely flowable. Mix 1 was fairly easy to indent. At 10:00 PM of Day 1, Mixes 1 and 2 were very hard.

From the results of Example 10 it can be seen that the higher quantity of furfuryl alcohol increases hardening. Use of CYMEL 301 delays hardening.

EXAMPLE 11

Attempted Polymerization Of Resin I And Furfuryl Alcohol Using Diethyl Hydrogen Phosphite At 23° C.

A vial was charged with a mixture of 4.25 g of Resin I, 2.0 g of furfuryl alcohol and 0.4 g of diethyl hydrogen phosphite of Aldrich Chemical Company having a 98% purity and molecular weight of 138. Observations in accordance with time are set forth in TABLE 11.

From TABLE 11 it can be seen that diethyl hydrogen phosphite is an ineffective room temperature hardener for resole/furfuryl alcohol mixture. This is in marked contrast to the diaryl hydrogen phosphite.

TABLE 11

ATTEMPTED POLYMERIZATION OF RESIN I AND FURFURYL ALCOHOL USING DIETHYL HYDROGEN PHOSPHITE AT 23° C.

| Hours Elapsed | Order of Viscosity Increase for the Various Mixes |
|---|---|
| 2 | No change was discernible. |
| 3 | No change was discernible. |
| 21 | The mixture was still very fluid |
| 22 | 0.2 g additional diethyl phosphite was added to the mixture for a total of 0.6 g. |
| 48 | No obvious viscosity increase was observed. |
| 72 | The mix had a dark amber color and was still fluid. |
| 96 | The mix was very dark and somewhat syrupy. |
| 240 | The mix was still very fluid and it was discarded. |

EXAMPLE 12

Effect Of Water Pre-treatment Of Diphenyl Hydrogen Phosphite And Comparison Of Diphenyl Hydrogen Phosphite With Triphenyl Phosphite On Hardening Of Resin J Pre-treated with 2% DPP (B.O.R.) And Diluted With 11% Of Furfuryl Alcohol (B.O.R.)

Individual vials were charged with 4 g of Resin J which had been pre-neutralized with 2% DPP (B.O.R.) and diluted with 11% (B.O.R.) of furfuryl alcohol. To this was added 0.5 g DPP (diphenyl hydrogen phosphite) or triphenyl phosphite as is or in the case of DPP pre-treated with 2% or 5% water based on the weight of DPP as indicated. The mixes were made and observed at a temperature of 23° C. Mix 1 contained the DPP (DOVERPHOS 213 of the Dover Chemical Company) without pre-treatment. Mix 2 was the same as Mix 1 except that the DPP was pre-treated, i.e., partially hydrolyzed, with 2% of water, based on the weight of the phosphite. Mix 3 was the same as Mix 1 but the DPP was pre-treated with 5% water based on the weight of phosphite. Mix 4 contained triphenyl phosphite (TPP) (DOVERPHOS 10 of the Dover Chemical Company). Mix 5 was a 1:1 mixture of DPP and TPP for a total of 0.5 g.

The results of this example are set forth in TABLE 12. It can be seen from TABLE 12 that increasing the level of pre-hydrolysis of DPP significantly increased the hardening rate and that TPP is significantly a less effective room temperature hardener than DPP.

TABLE 12

EFFECT OF WATER PRE-TREATMENT OF DIPHENYL HYDROGEN PHOSPHITE AND COMPARISON OF DIPHENYL HYDROGEN PHOSPHITE WITH TRIPHENYL PHOSPHITE ON HARDENING OF RESIN J PRE-TREATED WITH 2% DPP (B.O.R.) AND DILUTED WITH 11% OF FURFURYL ALCOHOL (B.O.R.)

| Minutes Elapsed | Observations and Order of Viscosity Increase |
|---|---|
| 7 | Mix 3 became very hot, very dark and hardened. Mix 4 was heterogeneous and was agitated 2 to 3 times per hour. |
| 140 | Mix 1 was dark amber and slightly viscous. Mix 2 was very dark and quite viscous. Mix 4 was homogeneous and yellow to orange in color. |
| 270 | Mix 1 and Mix 2 were stick hard. Mix 4 had a slight golden color. Mix 5 moved very slowly. Mix 4 was amber |
| 365 | Mix 5 was immobile but not stick hard. |
| 435 | Mix 4 was amber but darker than the last reading. Mix 5 was immobile but not stick hard. |
| 555 | Mix 4 was dark. Mix 5 was still not stick hard. |
| 1125 | Mixes 4 and 5 were placed in 65° C. oven and were fairly hard after about 2.5 hours. |

EXAMPLE 13

Effect Of Reduced Level Of Diphenyl Hydrogen Phosphite And No Added Water On Hardening Of Resin B To 12.0 g of Resin B was added 0.60 g (5% B.O.R.) of diphenyl hydrogen phosphite to prepare a master sample. This provided a total water content of 1.5 per part by weight of the aryl phosphite. A Gardner tube was charged with a portion of the sample and viscosity followed with time at 25° C. The Gardner tube readings were converted to centistokes and the results are shown in TABLE 13.

At 3.25 hours after preparation of the above master sample, 1 g of the original solution in a small vial was placed in a 65° C. oven. After 0.5 hours at 65° C. the solution was mostly immobile and was like hard taffy. After one hour at 65° C. the sample was stick hard while hot.

It can be seen from TABLE 13 and the experimental work in the 65° C. oven that diphenyl hydrogen phosphite can be used to fairly rapidly cure a phenolic resin at 65° C. while providing extended (at least 6 hours of work time at 25° C. by use of a low concentration of the DPP and water.

TABLE 13

EFFECT OF REDUCED LEVEL OF DIPHENYL HYDROGEN PHOSPHITE AND NO ADDED WATER ON HARDENING OF RESIN B

| Time in Hours | Viscosity in Centistokes |
|---|---|
| 0 | 550 |
| 1 | 558 |
| 2 | 570 |
| 3 | 576 |
| 4 | 601 |
| 5 | 620 |
| 6 | 692 |
| 7 | 755 |
| 7.5 | 820 |

EXAMPLE 14

Alcoholysis Of Aryl Phosphites And Effect On Resin B Hardening

In this example, diphenyl hydrogen phosphite (DPP) and triphenyl phosphite (TPP) and such phosphites modified by presolvolysis with methanol and/or ethylene glycol were tested to determine their effect on hardening of resole Resin B.

Mixes were prepared by: dissolving 0.5 g, (10% B.O.R.) of DPP (diphenyl hydrogen phosphite) or 0.5 TPP (triphenyl phosphite) (10% B.O.R.) in 5.0 g of Resin B. Also, in 5 g of Resin B there was added 0.5 q of a mixture containing DPP or TPP which had been pre-treated with 5% of ethylene glycol (EG) based on the weight of the phosphite, or with 5% of methanol (ME) based on the weight of the phosphite. In preparing the mixes containing the ethylene glycol, the ethylene glycol was placed in the phosphite hardener and stirred for half an hour at room temperature and then heated for 2 hours at 65° C. In preparing the mixes containing the methanol, the methanol was placed in the phosphite hardener and permitted to stand at 23° C. for 2 hours.

The mixes prepared as above with TPP and TPP plus ME were not completely miscible in the resin. The TPP and TPP plus ME mixes were then vigorously agitated and 1.0 g of each transferred to small glass vials which were placed in a 65° C. oven along with the TPP plus ethylene glycol mix. All mixes quickly became clear upon warming. The results of continued heating in the 65° C. oven are shown below wherein: TPP/EG represents the resin mix which contained triphenyl phosphite and ethylene glycol; TPP represents the mix which only contained the triphenyl phosphite; and TPP/ME represents the mix which contained triphenyl phosphite and methanol.

| Time Elapsed, In Hours at 65° C. | Observations And Viscosity Increase |
|---|---|
| 0.5 | TPP/EG very close to stick hard, other mixes clear and very fluid while hot. |
| 0.75 | TPP/EG stick hard. No obvious change in other mixes |
| 1.5 | TPP immobile and tacky, TPP/ME still fluid. |
| 2.33 | TPP hard but not stick hard while hot, TPP/ME immobile but tacky. |
| 3 | TPP stick hard while hot, TPP/ME tack free. |
| 4.5 | TPP/ME very close to stick hard while hot. |
| 5.5 | TPP/ME was stick hard while hot. |

Mixes prepared as above containing TPP and alcohols were observed for room temperature hardening. The results were as follows.

| Time Elapsed At 23° C., In Hours | Observations and Viscosity Increase |
|---|---|
| 16 | TPP/EG was immobile, tack-free, TPP and TPP/ME were clear and fluid, with the TPP being somewhat more viscous. |
| 22 | TPP/EG was fairly close to stick hard. The other mixes were clear and mobile, with the TPP being less mobile than the TPP/ME. |
| 25 | TPP/EG was stick hard. |
| 40 | TPP and TPP/ME were clear. TPP was fairly viscous whereas TPP/ME was not. |

In a manner similar to that above for observing the viscosity increase at 23° C. of the TPP containing mixes, mixes of DPP, DPP/EG, and DPP/ME with Resin B were observed over a period of time. It was found that the order of reactivity was: DPP/EG was slightly greater than DPP which in turn was significantly greater than DPP/ME. The later was very close to stick hard after 19.5 hours whereas DPP and DPP/EG were essentially stick hard after 12 hours.

It can be seen from this EXAMPLE 14 that: pre-treatment of DPP or TPP with ethylene glycol enhances hardening; pre-treatment with methanol retards hardening; TPP/ethylene glycol can be used for room temperature hardening; and the DPP and its alcoholized products were more reactive than TPP and its corresponding alcoholized products.

EXAMPLE 15

Attempted Acid Polymerization Of Resole Resin C

Four grams (4 g) of Resin C was charged to each of four vials. Various latent acidic materials, 0.5 g, as indicated below, was then added to each vial for preparation of each Mix. The latent acidic material added to Mix 1 was diphenyl hydrogen phosphite. The latent acidic material added to Mix 2 was ethyl trifluoroacetate. The latent acidic material added to Mix 3 was trimethyl phosphite. Mix 2 was not homogeneous and was agitated several times per hour until it became homogeneous. The results of this example are shown in TABLE 15 wherein the time elapsed is measured from the time the mixes were prepared.

It can be seen from TABLE 15 that trimethyl phosphite was ineffective as a latent acid catalyst for room temperature hardening of Resin C. The trifluoroacetate ester was marginally effective, possibly because of its initial insolubility.

TABLE 15

ATTEMPTED ACID POLYMERIZATION OF RESOLE RESIN C

| Time Elapsed | Observations and Viscosity Increase |
| --- | --- |
| Half an Hour | Mix 1 was dark and moderately viscous. Mix 2 and Mix 3 showed no change. |
| 1.5 Hours | Mix 1 was very dark and very viscous. |
| 5.5 Hours | Mix 2 changed color to a yellow, then green yellow and then to amber. |
| 10 Hours | Mix 2 was fairly viscous. |
| 20 Hours | Mix 2 was very dark, immobile, and "stick clean". |
| 2 Days | Mix 2 was quite hard. |
| 3 Days | Mix 3 was golden yellow and very fluid. |
| 10 Days | Mix 3 was light amber in color and very fluid. |

EXAMPLE 16

Phenyl Trifluoroacetate As latent Acid Catalyst

Mix 1 contained 3.0 g of Resin B, 0.12 g of added water (4% B.O.R.) and 0.5 q of phenyl trifluoroacetate which was placed last in the mixture. The acetate did not dissolve in the resin. The mixture was vigorously agitated periodically for 5 minutes. It then became slightly warm. After 15 minutes at room temperature Mix 1 was opaque and moderately viscous. After 55 minutes, Mix 1 was taffy-like. After about 2 hours, Mix 1 was an immobile mass and was stick hard.

Mix 2 contained 3.0 g of Resin B, 0.12 g of methanol, and 0.5 g of the phenyl trifluoroacetate which was added last. This mix was also not homogeneous initially and it was vigorously agitated intermittently over a period of 20 minutes and then occasionally over the next 20 minutes. After 50 minutes, the mix became clear and produced some bubbles and became moderately viscous. After 2 hours, Mix 2 was opaque and moved slowly like molasses. After 3 hours, Mix 2 was taffy-like. After 4.75 hours Mix 2 was not quite tack-free. Mix 2 was then heated to about 27° C. for about another hour and it became tack-free. By thereafter leaving Mix 2 stand overnight at room temperature, Mix 2 became stick hard.

Mix 3 contained 3.0 of Resin C, and 0.5 g of phenyl trifluoroacetate. This composition was mixed well for half a minute. Within 8 minutes thereafter, the mix came to a boil, and was black and hard.

Mix 4 contained 3.0 g of Resin C, and 0.5 g of diphenyl hydrogen phosphite. After 2 hours the mix was dark amber and very fluid. After 2.5 hours, the mix was black . After 3 hours there was an obvious viscosity increase. After 4 hours, the mix was moderately viscous but flows freely. After 6 hours, the mix was immobile but tacky. After standing overnight at about 23° C., the mix was stick hard.

It can be seen from EXAMPLE 16 that the phenyl trifluoroacetate shows poor miscibility but can, in a poorly controlled manner, lead to very rapid hardening which is faster than diphenyl hydrogen phosphite.

EXAMPLE 17

Hardening Of Modified Phenolic Resole Resin

A modified phenolic resole resin is prepared in accordance with U.S. Pat. No. 4,740,535 of Apr. 26, 1988 which issued to R. Iyer et al. Example 4 of that patent is followed to produce the resin with the exception that the resin is not diluted with methanol. Ten g of the modified phenolic resole resin is mixed with 1.5 g of diphenyl hydrogen phosphite. The resin hardens within 24 hours at 23° C.

EXAMPLE 18

Effect Of Acetoacetamide, Cyanoacetamide, And Formanilide On Hardening Of Resin B With Diphenyl Hydrogen Phosphite The mixes were prepared by mixing 4.0 g of Resin B, 0.16 g of water (4% B.O.R.), 5% B.O.R. of the indicated additive, and lastly, 0.52 g of diphenyl hydrogen phosphite ( 13% B.O.R.). Mix 1 was the control and did not contain an additive; Mix 2 contained acetoacetamide; Mix 3 contained cyanoacetamide; and Mix 4 contained formanilide.

One g of each mix as prepared above was transferred to a small glass vial which was placed in an oven at 65° C. At 17 minutes at 65° C., Mixes 1, 2, and 3 were stick hard while Mix 4 became hard at 20 minutes at 65° C.

Mixes as prepared above were then tested for hardening at 23° C. All mixes appeared very fluid and equivalent as to viscosity initially. At 2 hours at 23° C., Mix 1 (the control) appeared slightly more viscous than the others. The table below is a continuation of this room temperature test wherein the "hours elapsed" are measured from the time the mixes were prepared.

| Hours Elapsed | Order of Increasing Viscosity of Mixes and Remarks |
| --- | --- |
| 3 | 1 ≧ 2, 3 and 4. |
| 4 | 1, 3 ≧ 2 ≧ 4. |
| 5 | 1 ≧ 3 ≧ 2 ≧ 4. Mix 1 was moderately viscous. |
| 5.66 | 1 ≧ 3 > 2 ≧ 4. Mix 1 started to cloud while 4 was fairly mobile. |

-continued

| Hours Elapsed | Order of Increasing Viscosity of Mixes and Remarks |
|---|---|
| 6.5 | 1 > 3 > 2 ≧ 4. Mix 1 was very viscous while Mix 3 started to cloud. |
| 6.66 | Mix 4 started to cloud. |
| 7.0 | 1 > 3 > 2 ≧ 4. Mix 2 was still clear. |
| 7.17 | Mix 2 started to cloud while Mix 1 was almost immobile. |
| 9.33 | Mixes 1 and 3 were immobile and both are tacky. Mix 4 was fairly mobile while Mix 2 was barely mobile. |
| 10.33 | Mix 1 was tack-free. |
| 11.83 | Mix 3 was tack-free. Mix 4 flows very slowly. |
| 12.83 | Mix 1 was close to stick hard. Mix 2 was barely tack-free. Mix 4 still flowed very slowly. Mix 3 was firm but easily penetrated. |
| 21 | Mix 3 was stick hard. Mix 2 was very close to stick hard. Mix 4 was barely tack-free. |
| 25.33 | Mix 2 was essentially stick hard. Mix 4 was firm but easily penetrated. |
| ≧26.33 | Mix 4 was very close to stick hard. |

It can be seen from this EXAMPLE 18 that at 5% B.O.R. levels, the acetoacetamide and cyanoacetamide have no obvious effect on hardening at 65° C. whereas formanilide has a small retarding effect. At room temperature formanilide is a strong retarder and acetoacetamide and cyanoacetamide are moderate retarders.

What I claim is:

1. A composition comprising:
   A. an acid hardenable phenolic resin; and
   B. from about 3% to 20% or an aryl phosphite, based on the weight of resin, wherein said phosphite has been pre-solvolyzed with from about 1% to 10% of water, alkanol of 1 to 4 carbon atoms, or alkylene glycol having from 2 to 4 carbon atoms, based on the weight of phosphite, said phosphite having the formula

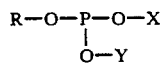

wherein each of R and X is aryl of 6 to 12 carbon atoms, and Y is a member selected from the group consisting of hydrogen, aryl of 6 to 12 carbon atoms, and alkyl of about 1 to 12 carbon atoms.

2. The composition of claim 1 wherein each of R and X is a member selected from the group consisting of phenyl, p-cresyl and m-cresyl and Y is a member selected from the group consisting of phenyl, p-cresyl, m-cresyl, alkyl of about 1 to 8 carbon atoms, and hydrogen.

3. The composition of claim 1 wherein the aryl phosphite has been pre-solvolyzed with water.

4. The composition of claim 1 wherein the aryl phosphite has been pre-solvolyzed with ethylene glycol.

5. The composition of claim 1 wherein each of R, X, and Y is phenyl, p-cresyl, or m-cresyl.

6. The composition of claim 1 wherein each of R and X is phenyl p-cresyl, or m-cresyl and Y is alkyl of 1 to 12 carbon atoms.

7. The composition of claim 1 wherein each of R and X is phenyl p-cresyl, or m-cresyl, and Y is hydrogen.

8. A composition consisting essentially of:
   A. an acid hardenable phenolic resin; and
   B. from about 3% to 20% by weight of the resin of an aryl phosphite having the formula

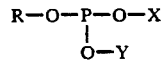

wherein each of R and X is phenyl, m-cresyl, or p-cresyl and Y is hydrogen.

9. The composition of claim 8 wherein the resin is a phenolic resole resin and the composition contains from 0.15 to 5 parts of water for each part by weight of aryl phosphite.

10. The composition of claim 9 wherein the resole resin is the condensation product of phenol and formaldehyde.

11. A method for hardening a phenolic resin while providing an extended work time which comprises:
    A. preparing a composition by contacting (a) a phenolic resin which is acid hardenable with (b) an aryl phosphite in an amount sufficient to harden the resin, said phosphite having the general formula

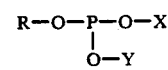

wherein each of R and X is aryl of 6 to 12 carbon atoms, and Y is a member selected from the group consisting of aryl of 6 to 12 carbon atoms, alkyl of 1 to 12 carbon atoms, and hydrogen;
    B. increasing the acidity of the composition due to hydrolysis of the phosphite and hardening the composition at a temperature of from about 50° C. to about 95° C.; and
    C. wherein the composition has a total water content in sufficient amount to hydrolyze the phosphite.

12. The method of claim 11 wherein the composition remains fluid at ambient temperature for a period of at least 4 hours prior to heating.

13. The method of claim 11 wherein each of R, X, and Y is phenyl, p-cresyl or m-cresyl.

14. The method of claim 11 wherein each of R and X are phenyl, p-cresyl or m-cresyl and Y is hydrogen.

15. A method for preparing a hardened phenolic resin composition at ambient temperature which comprises: contacting a phenolic resin which is acid hardenable with an aryl phosphite in an amount sufficient to harden the resin, said phosphite being solvolyzed prior to contact with the resin with from about 1% to 10%, based on the weight of phosphite, with a member selected from the group consisting of water, an alkanol having from 1 to 4 carbon atoms, and an alkylene glycol of 2 to 4 carbon atoms, said phosphite having the formula

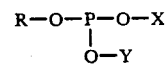

wherein each of R and X is aryl of 6 to 12 carbon atoms, and Y is a member selected from the group consisting of aryl of 6 to 12 carbon atoms, alkyl of about 1 to 12 carbon atoms, and hydrogen; and wherein the phosphite is in contact with a sufficient total water content to hydrolyze the phosphite.

16. The method of claim 15 wherein the hardened composition is subsequently heated at a temperature above 50° C.

17. The method of claim 15 wherein each of R, X, and Y is phenyl, p-cresyl, or m-cresyl, and the resin is a resole resin.

18. The method of claim 15 wherein each of R and X are phenyl, p-cresyl or m-cresyl and Y is alkyl of about 1 to 12 carbon atoms and the resin is a resole resin.

19. The method of claim 15 wherein each of R and X are phenyl, p-cresyl or m-cresyl and Y is hydrogen and the resin is a resole resin.

20. A method for the ambient temperature hardening of a phenolic resin composition which comprises contacting an acid hardenable phenolic resin with an aryl phosphite in an amount sufficient to harden the resin in the presence of a total water content sufficient to hydrolyze the phosphite while increasing the acidity of the composition due to hydrolysis of the phosphite and hardening the composition at a pH of less than 4, said phosphite having the formula
wherein each of R and X is aryl of 6 to 12 carbon atoms, and Y is hydrogen.

21. The method of claim 20 wherein the resin is a phenolic resole resin containing at least 3% by weight thereof of water.

22. The method of claim 21 wherein the hardened composition is subsequently heated at a temperature of 50° C. to 100° C.

23. The method of claim 21 wherein the phosphite is diphenyl hydrogen phosphite, di(p-cresyl) hydrogen phosphite, di(m-cresyl) hydrogen phosphite, p-cresyl phenyl hydrogen phosphite, or m-cresyl phenyl hydrogen phosphite and mixtures thereof.

24. The method of claim 20 wherein the resin is the condensation product of phenol and formaldehyde prepared in the presence of an alkaline catalyst and the pH of the resin is from about 4 to 7.

25. The method of claim 20 wherein the resin is the alkaline condensation product of phenol and formaldehyde having a water content of from about 3% to 20% by weight thereof, and the phosphite is diphenyl hydrogen phosphite in a quantity of from about 3% to 20% based on the weight of resin.

26. The composition of claim 1 wherein the phenolic resin is a phenolic resole resin and the quantity of water, alkanol or alkylene glycol is from 2% to 7% by weight of the phosphite.

27. The composition of claim 26 wherein the resole resin is the condensation product of phenol and formaldehyde.

28. The method of claim 11 wherein the phosphite is pre-solvolyzed with from 1% to 10%, based on the weight of the phosphite, of an agent selected from the group consisting of water, alkanol of 1 to 4 carbon atoms, and an alkylene glycol having from 2 to 4 carbon atoms.

29. The method of claim 28 wherein the phosphite is pre-solvolyzed with from 2% to 7% of an alkylene glycol.

30. The method of claim 28 wherein Y is hydrogen.

31. The method of claim 28 wherein Y is alkyl.

32. The method of claim 28 wherein Y is aryl.

33. The method of claim 15 wherein the member for pre-solvolyzing the phosphite is from 2% to 7% of ethylene glycol.

34. A method for hardening a phenolic resin while providing an extended work time which comprises:
A. preparing a composition by contacting (a) a phenolic resin which is acid hardenable with (b) an aryl phosphite in an amount sufficient to harden the resin, said phosphite having the general formula

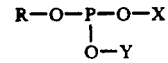

wherein each of R and X is aryl of 6 to 12 carbon atoms, and Y is hydrogen;
B. the composition has a total water content in sufficient amount to hydrolyze the phosphite; and
C. the resin is prepared by condensing a phenolic compound with formaldehyde in the presence of an alkaline catalyst and adding to the resin an acid having a $pK_a$ of not greater than 1.2 to lower the pH of the resin to that of about 4 to 7.

35. The method of claim 34 wherein the phenolic compound is phenol.

36. The method of claim 34 wherein the resin contains at least 3% by weight of water.

37. The method of claim 34 wherein the phenolic resin is a phenolic resole resin.

38. A composition consisting essentially of:
A. an acid hardenable phenolic resin; and
B. from about 3% to 20% by weight of the resin of an aryl phosphite having the formula

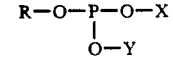

wherein each of R and X is phenyl, m-cresyl, or p-cresyl and Y is hydrogen.

39. The composition of claim 38 wherein the resin is a phenolic resole resin.

40. The composition of claim 38 containing a sufficient amount of water to hydrolyze the phosphite and harden the composition.

* * * * *

UNITED STATES PATENT AND TRADEMARK OFFICE
CERTIFICATE OF CORRECTION

PATENT NO.  : 5,296,520
DATED       : March 22, 1994
INVENTOR(S) : Arthur H. Gerber It is certified that error appears in the above-identified patent and that said Letters Patent is hereby corrected as shown below:

In Col. 27, line 18, after "phosphite having the formula" insert $$\begin{array}{c} \underline{R-O-P-O-X} \\ | \\ \underline{O-Y} \end{array}$$ --.

Signed and Sealed this

Nineteenth Day of July, 1994

Attest:

BRUCE LEHMAN

Attesting Officer    Commissioner of Patents and Trademarks